United States Patent
Fong et al.

(10) Patent No.: US 11,728,940 B2
(45) Date of Patent: Aug. 15, 2023

(54) COMMUNICATION SEQUENCING

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Hua Wang, Basking Ridge, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 17/249,948

(22) Filed: Mar. 19, 2021

(65) Prior Publication Data

US 2021/0314106 A1 Oct. 7, 2021

Related U.S. Application Data

(60) Provisional application No. 63/003,623, filed on Apr. 1, 2020.

(51) Int. Cl.
*H04L 1/1867* (2023.01)
*H04W 72/1263* (2023.01)
*H04W 72/23* (2023.01)
*H04W 92/18* (2009.01)

(52) U.S. Cl.
CPC ....... *H04L 1/1896* (2013.01); *H04W 72/1263* (2013.01); *H04W 72/23* (2023.01); *H04W 92/18* (2013.01)

(58) Field of Classification Search
CPC .. H04L 1/1887; H04L 1/1896; H04W 72/042; H04W 72/1263; H04W 76/14; H04W 76/15; H04W 92/18
See application file for complete search history.

(56) References Cited

U.S. PATENT DOCUMENTS

| 10,555,143 | B2 * | 2/2020 | Uchiyama | H04W 4/38 |
| 10,912,108 | B2 * | 2/2021 | Lee | H04W 4/40 |
| 10,931,426 | B2 * | 2/2021 | Desai | H04L 1/1671 |
| 11,005,607 | B2 * | 5/2021 | Basu Mallick | H04L 1/1887 |
| 11,363,429 | B2 * | 6/2022 | Uchiyama | H04W 4/40 |

(Continued)

FOREIGN PATENT DOCUMENTS

| AU | 2017214894 A1 * | 8/2018 | ............ H04W 4/046 |
| AU | 2017214894 B2 * | 9/2019 | |

(Continued)

*Primary Examiner* — Eric Nowlin
(74) *Attorney, Agent, or Firm* — Harrity & Harrity, LLP

(57) ABSTRACT

Various aspects of the present disclosure generally relate to wireless communication. In some aspects, a wireless device may receive, for communications with one or more of a base station or another wireless device, information identifying that an uplink transmission on a sidelink and a downlink transmission on a sidelink are to precede an uplink transmission on an access link and a downlink transmission on an access link. The wireless device may communicate, with the one or more of the base station or the other wireless device, based at least in part on the information identifying that the uplink transmission on the sidelink and the downlink transmission on the sidelink are to precede the uplink transmission on the access link and the downlink transmission on the access link. Numerous other aspects are provided.

30 Claims, 10 Drawing Sheets

(56) References Cited

U.S. PATENT DOCUMENTS

| | | | |
|---|---|---|---|
| 11,388,663 B2 * | 7/2022 | Chen | H04L 1/1896 |
| 11,509,429 B2 * | 11/2022 | Basu Mallick | H04L 1/08 |
| 11,589,369 B2 * | 2/2023 | Akkarakaran | H04L 5/0053 |
| 2018/0288588 A1 * | 10/2018 | Uchiyama | H04W 4/38 |
| 2019/0364588 A1 * | 11/2019 | Lu | H04L 1/1887 |
| 2020/0037398 A1 * | 1/2020 | Adachi | H04B 7/15542 |
| 2020/0059944 A1 * | 2/2020 | Lee | H04W 4/40 |
| 2020/0092692 A1 * | 3/2020 | Wang | H04W 76/14 |
| 2020/0195389 A1 * | 6/2020 | Basu Mallick | H04W 4/40 |
| 2020/0196120 A1 * | 6/2020 | Uchiyama | H04W 4/38 |
| 2020/0275474 A1 * | 8/2020 | Chen | H04L 1/1607 |
| 2021/0037549 A1 * | 2/2021 | Akkarakaran | H04W 72/51 |
| 2021/0258108 A1 * | 8/2021 | Basu | H04W 4/70 |
| 2021/0337512 A1 * | 10/2021 | Belleschi | H04W 4/40 |
| 2021/0345378 A1 * | 11/2021 | Lu | H04L 69/40 |
| 2021/0360520 A1 * | 11/2021 | Chen | H04W 48/20 |
| 2021/0368465 A1 * | 11/2021 | Chen | H04L 1/0061 |
| 2022/0140955 A1 * | 5/2022 | Liu | H04W 72/0406 370/329 |
| 2022/0303962 A1 * | 9/2022 | Sun | H04W 72/044 |
| 2022/0376829 A1 * | 11/2022 | Zhao | H04W 4/70 |
| 2022/0394674 A1 * | 12/2022 | Chen | H04W 72/10 |

FOREIGN PATENT DOCUMENTS

| | | | | |
|---|---|---|---|---|
| CA | 3031713 A1 | * | 2/2018 | H04L 1/08 |
| CN | 108605210 A | * | 9/2018 | H04W 4/046 |
| CN | 108923894 A | * | 11/2018 | H04L 1/0003 |
| CN | 109526247 A | * | 3/2019 | H04L 1/08 |
| CN | 111567108 A | * | 8/2020 | H04L 1/1822 |
| CN | 111587547 A | * | 8/2020 | H04L 1/0061 |
| CN | 108605210 B | * | 10/2021 | H04W 4/046 |
| CN | 109526247 B | * | 12/2021 | H04L 1/08 |
| CN | 113810879 A | * | 12/2021 | H04W 4/046 |
| CN | 114245339 A | * | 3/2022 | H04L 1/08 |
| CN | 114586436 A | * | 6/2022 | H04W 72/1278 |
| CN | 114616881 A | * | 6/2022 | H04W 72/02 |
| EP | 3282618 A1 | * | 2/2018 | H04L 1/08 |
| EP | 3412042 B1 | * | 3/2020 | H04W 4/046 |
| EP | 3709678 A1 | * | 9/2020 | H04W 4/046 |
| EP | 3709678 B1 | * | 8/2022 | H04W 4/046 |
| EP | 4042786 A1 | * | 8/2022 | H04W 72/1278 |
| JP | 2017139662 A | * | 8/2017 | H04W 4/046 |
| JP | 2019530268 A | * | 10/2019 | |
| JP | 6790371 B2 | * | 11/2020 | H04W 4/046 |
| JP | 7076428 B2 | * | 5/2022 | H04L 1/08 |
| JP | 2022549725 A | * | 11/2022 | |
| KR | 20190034557 A | * | 4/2019 | |
| KR | 20190058579 A | * | 5/2019 | |
| KR | 20190113919 A | * | 10/2019 | |
| KR | 20220042121 A | * | 4/2022 | |
| KR | 102469627 B1 | * | 11/2022 | |
| RU | 2019103388 A3 | * | 9/2020 | |
| RU | 2733420 C2 | * | 10/2020 | H04L 1/08 |
| TW | 202114367 A | * | 4/2021 | H04L 1/0061 |
| TW | 202114368 A | * | 4/2021 | H04L 1/1822 |
| WO | WO-2017135028 A1 | * | 8/2017 | H04W 4/046 |
| WO | WO-2018029023 A1 | * | 2/2018 | H04L 1/08 |
| WO | WO-2018074876 A1 | * | 4/2018 | H04W 4/40 |
| WO | WO-2018171540 A1 | * | 9/2018 | H04L 1/0003 |
| WO | WO-2020063857 A1 | * | 4/2020 | H04L 1/0061 |
| WO | WO-2020063873 A1 | * | 4/2020 | H04L 1/1822 |
| WO | WO-2021022136 A1 | * | 2/2021 | H04L 5/0053 |
| WO | WO-2021068185 A1 | * | 4/2021 | |
| WO | WO-2021068859 A1 | * | 4/2021 | H04W 72/1278 |
| WO | WO-2021087853 A1 | * | 5/2021 | H04W 72/02 |

* cited by examiner

COMMUNICATION SEQUENCING

CROSS-REFERENCE TO RELATED APPLICATION

This Patent application claims priority to U.S. Provisional Patent Application No. 63/003,623, filed on Apr. 1, 2020, entitled "COMMUNICATION SEQUENCING FOR INDUSTRIAL INTERNET OF THINGS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for communication sequencing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless device, may include receiving, for communications with one or more of a base station or another wireless device, information identifying that an uplink transmission on a sidelink and a downlink transmission on a sidelink are to precede an uplink transmission on an access link and a downlink transmission on an access link; and communicating, with the one or more of the base station or the other wireless device, based at least in part on the information identifying that the uplink transmission on the sidelink and the downlink transmission on the sidelink are to precede the uplink transmission on the access link and the downlink transmission on the access link.

In some aspects, a method of wireless communication, performed by a base station, may include transmitting, for communications with one or more of a first wireless device or a second wireless device, information identifying that an uplink transmission on a sidelink and a downlink transmission on a sidelink are to precede an uplink transmission on an access link and a downlink transmission on an access link; and communicating, with the one or more of the first wireless device or the second wireless device, based at least in part on the information identifying that the uplink transmission on the sidelink and the downlink transmission on the sidelink are to precede the uplink transmission on the access link and the downlink transmission on the access link.

In some aspects, a wireless device for wireless communication may include a memory and one or more processors operatively coupled to the memory. The memory and the one or more processors may be configured to receive, for communications with one or more of a base station or another wireless device, information identifying that an uplink transmission on a sidelink and a downlink transmission on a sidelink are to precede an uplink transmission on an access link and a downlink transmission on an access link; and communicate, with the one or more of the base station or the other wireless device, based at least in part on the information identifying that the uplink transmission on the sidelink and the downlink transmission on the sidelink are to precede the uplink transmission on the access link and the downlink transmission on the access link.

In some aspects, a base station for wireless communication may include a memory and one or more processors operatively coupled to the memory. The memory and the one or more processors may be configured to transmit, for communications with one or more of a first wireless device or a second wireless device, information identifying that an uplink transmission on a sidelink and a downlink transmission on a sidelink are to precede an uplink transmission on an access link and a downlink transmission on an access link; and communicate, with the one or more of the first wireless device or the second wireless device, based at least in part on the information identifying that the uplink transmission on the sidelink and the downlink transmission on the sidelink are to precede the uplink transmission on the access link and the downlink transmission on the access link.

In some aspects, a non-transitory computer-readable medium may store one or more instructions for wireless communication. The one or more instructions, when executed by one or more processors of a wireless device, may cause the one or more processors to receive, for communications with one or more of a base station or another wireless device, information identifying that an uplink transmission on a sidelink and a downlink transmission on a sidelink are to precede an uplink transmission on an access link and a downlink transmission on an access link; and communicate, with the one or more of the base station or the other wireless device, based at least in part on the information identifying that the uplink transmission on the sidelink and the downlink transmission on the sidelink are to precede the uplink transmission on the access link and the downlink transmission on the access link.

In some aspects, a non-transitory computer-readable medium may store one or more instructions for wireless communication. The one or more instructions, when executed by one or more processors of a base station, may cause the one or more processors to transmit, for communications with one or more of a first wireless device or a second wireless device, information identifying that an uplink transmission on a sidelink and a downlink transmission on a sidelink are to precede an uplink transmission on an access link and a downlink transmission on an access link; and communicate, with the one or more of the first wireless device or the second wireless device, based at least in part on the information identifying that the uplink transmission on the sidelink and the downlink transmission on the sidelink are to precede the uplink transmission on the access link and the downlink transmission on the access link.

In some aspects, an apparatus for wireless communication may include means for receiving, for communications with one or more of a base station or a wireless device, information identifying that an uplink transmission on a sidelink and a downlink transmission on a sidelink are to precede an uplink transmission on an access link and a downlink transmission on an access link; and means for communicating, with the one or more of the base station or the wireless device, based at least in part on the information identifying that the uplink transmission on the sidelink and the downlink transmission on the sidelink are to precede the uplink transmission on the access link and the downlink transmission on the access link.

In some aspects, an apparatus for wireless communication may include means for transmitting, for communications with one or more of a first wireless device or a second wireless device, information identifying that an uplink transmission on a sidelink and a downlink transmission on a sidelink are to precede an uplink transmission on an access link and a downlink transmission on an access link; and means for communicating, with the one or more of the first wireless device or the second wireless device, based at least in part on the information identifying that the uplink transmission on the sidelink and the downlink transmission on the sidelink are to precede the uplink transmission on the access link and the downlink transmission on the access link.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
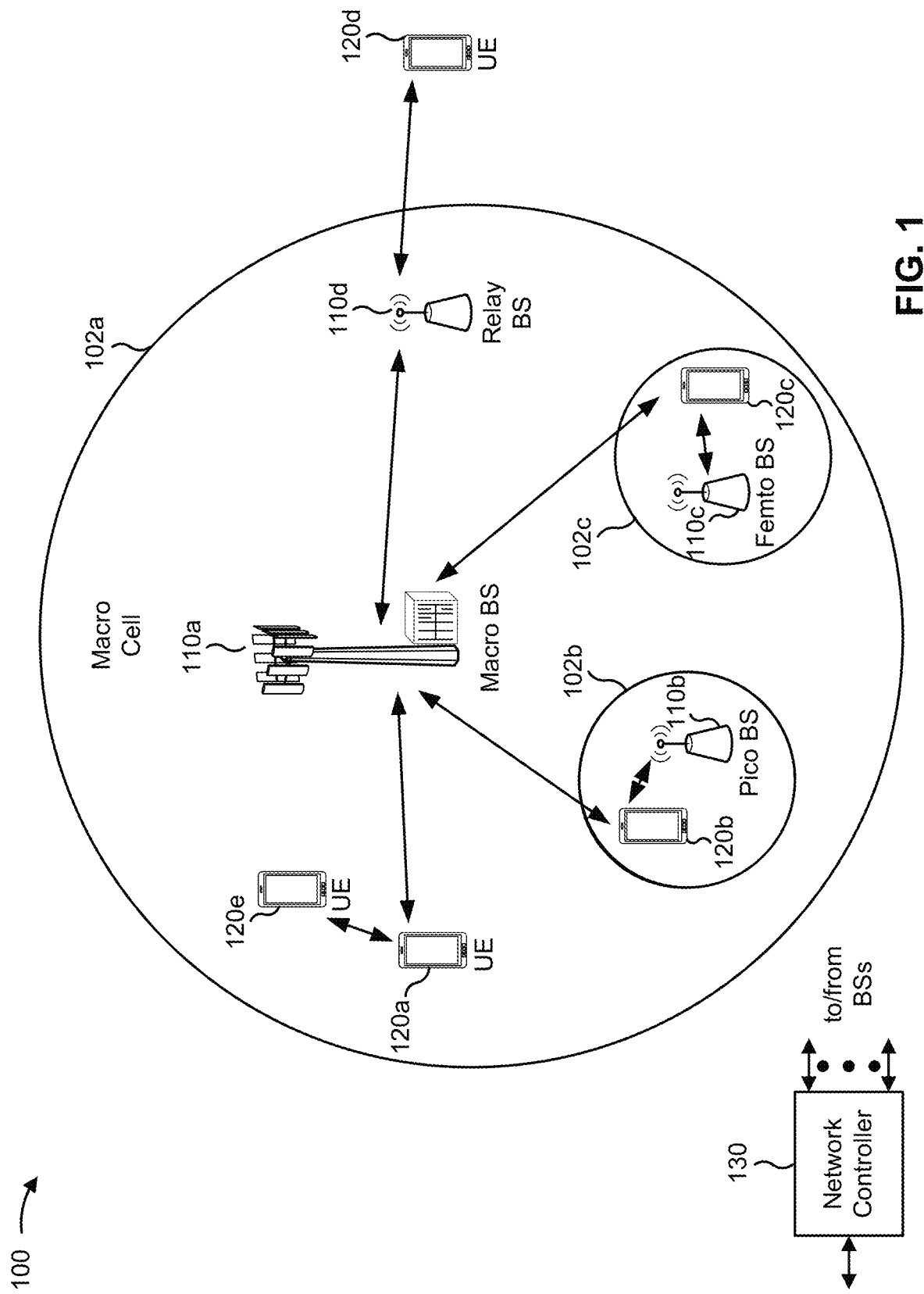
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
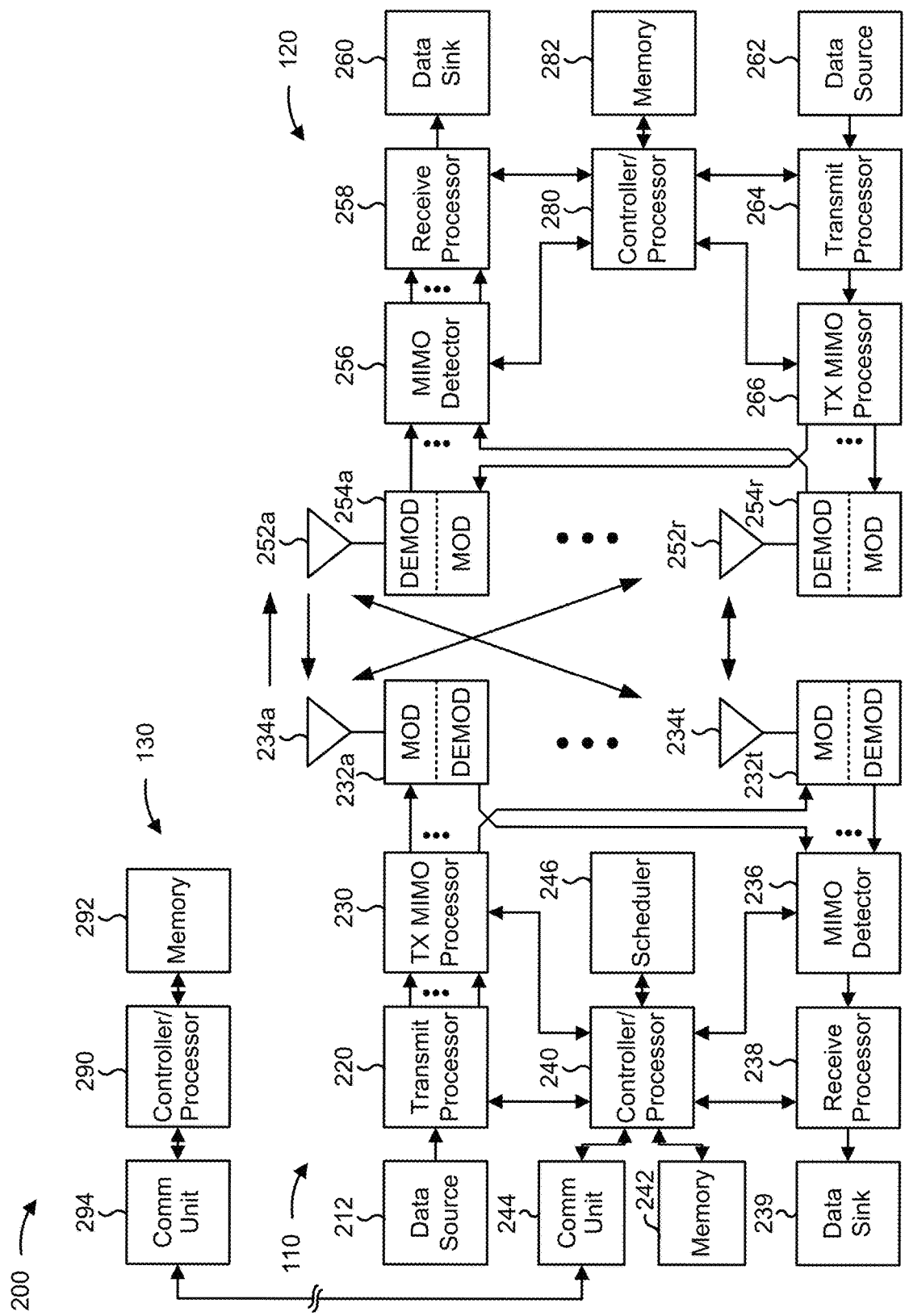
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-10).

In some aspects, the wireless device described herein is the base station 110, is included in the base station 110, or includes one or more components of the base station 110 shown in FIG. 2. In some aspects, the wireless device described herein is the UE 120, is included in the UE 120, or includes one or more components of the UE 120 shown in FIG. 2. Controller/processor 240 of base station 110, controller/processor 280 of UE 120, and/or any other component(s) of FIG. 2 may perform one or more techniques associated with communication sequencing, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a wireless device (e.g., a UE 120) may include means for receiving, for communications with one or more of a base station or another wireless device, information identifying that an uplink transmission on a sidelink and a downlink transmission on a sidelink are to precede an uplink transmission on an access link and a downlink transmission on an access link, means for communicating, with the one or more of the base station or the other wireless device, based at least in part on the information identifying that the uplink transmission on the sidelink and the downlink transmission on the sidelink are to precede the uplink transmission on the access link and the downlink transmission on the access link, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, for communications with one or more of a first wireless device or a second wireless device, information identifying that an uplink transmission on a sidelink and a downlink transmission on a sidelink are to precede an uplink transmission on an access link and a downlink transmission on an access link, means for communicating, with the one or more of the first wireless device or the second wireless device, based at least in part on the information identifying that the uplink transmission on the sidelink and the downlink transmission on the sidelink are to precede the uplink transmission on the access link and the downlink transmission on the access link, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
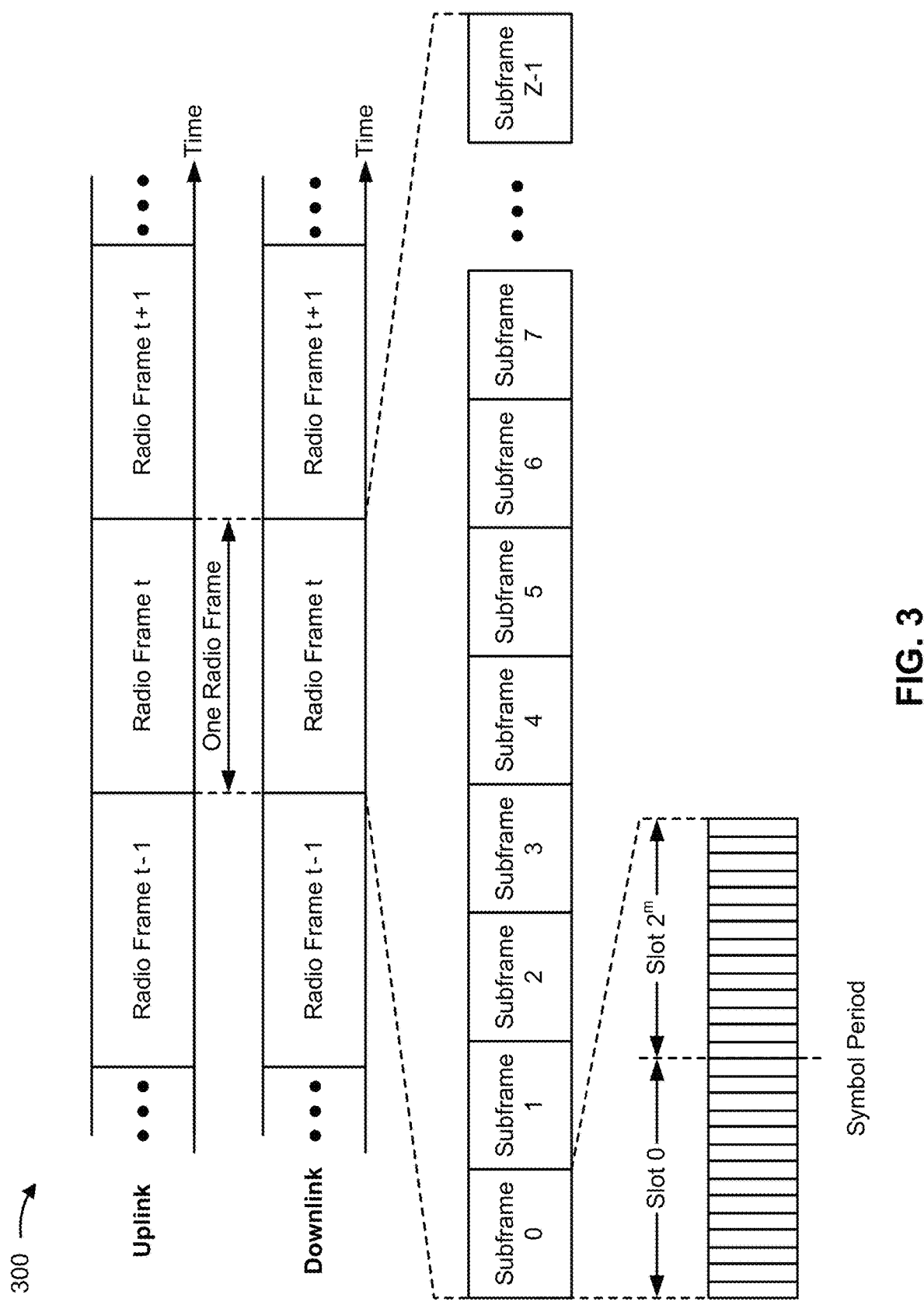
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4A:
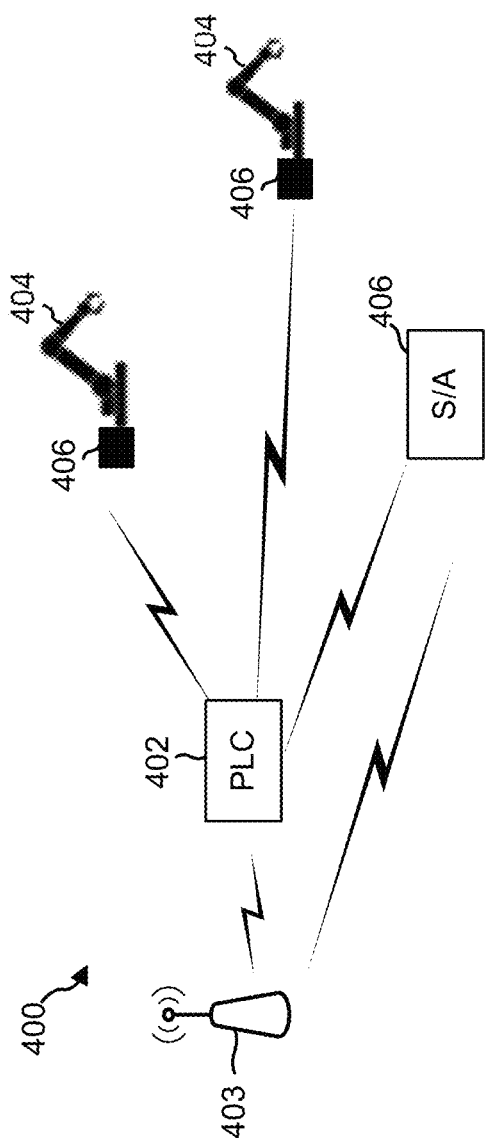
FIG. 4A is a diagram illustrating an example of a wireless communication system, in accordance with the present disclosure.

FIG. 4A is a diagram illustrating an example 400 of a wireless communication system, in accordance with the present disclosure. In some aspects, the wireless communication system may be an Industrial Internet-of-Things (I-IoT) communication system. I-IoT is a branch of cellular technology in which UEs and base stations are used to carry control data, measurement data, and/or the like, between various industrial systems. For example, I-IoT may be used to control a sensor and/or actuator (S/A), to exchange measurement information between programmable logic controllers (PLCs) of a factory floor, and/or the like. I-IoT presents certain challenges with regard to interference and scheduling. For example, I-IoT may be associated with a small path loss due to a waveguide effect. Furthermore, reflections in the environment (e.g., from moving components, robots, and/or the like) may cause rapidly-varying interference patterns.

In some aspects, the wireless communication system may include one or more PLCs 402, a base station 403, and one or more S/As 406. The wireless communication system may be associated with a factory, an industrial facility, and/or the like.

As shown in FIG. 4A, a PLC 402 may exchange wireless communications with one or more S/As 406. The one or more S/As 406 may be associated with equipment 404 (e.g., factory equipment). For example, an S/A 406 may be separate from an equipment 404 (e.g., connected to the equipment 404 via a wired or wireless connection) and/or may be disposed in, or positioned at, the equipment 404. The PLC 402 may automate control of the equipment 404, machines, control systems, and/or the like, based at least in part on communications with the S/As 406. The communications between the PLC 402 and S/A 406 (e.g., communications via a sidelink or via the base station 403) may include cyclic exchanges of information (e.g., the traffic is deterministic and periodic).

As also shown in FIG. 4A, the base station 403 may exchange communications with the PLC 402 and/or the S/As 406. For example, the base station 403 may schedule sidelink communications between the PLC 402 and the S/As 406. Additionally, or alternatively, the base station 403 may relay communications between the PLC 402 and the S/As 406.

The wireless communication system may accommodate periodic, regular traffic between the PLC 402 and the S/As 406, as described below in connection with FIG. 4B. The communications between the PLC 402 and the S/As 406 may be associated with a low latency and a high reliability. For example, the communications may be associated with a latency of less than 2 milliseconds (ms) or less than 1 ms. The communications may have a reliability requirement on the order of $10^{-5}$ or $10^{-6}$, such as 99.9999% reliability. The latency and reliability may apply to data and control channels.

As indicated above, FIG. 4A is provided as an example. Other examples may differ from what is described with respect to FIG. 4A.

Figure 4B:
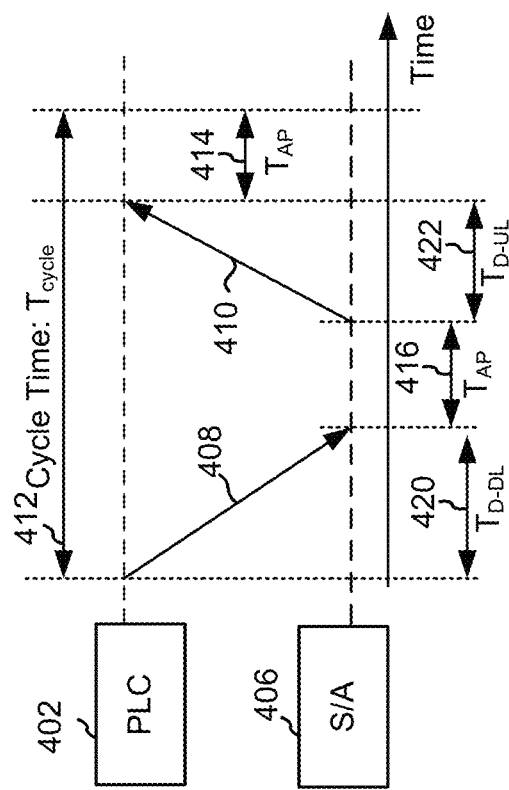
FIG. 4B is a diagram illustrating an example of cyclic traffic, in accordance with the present disclosure.

FIG. 4B is a diagram illustrating an example of cyclic traffic, in accordance with the present disclosure. The cyclic (or periodic) traffic may be exchanged between the PLC 402 and an S/A 406, as described above.

As shown, the PLC 402 may transmit communication 408, such as a command or other communication, to S/A 406 or equipment 404 during a period of time $T_{D\text{-}DL}$ 420. The communication 408 from the PLC to the S/A 406 may be referred to as a downlink communication (e.g., that is performed on a sidelink). The S/A 406 may receive the communication 408, and may perform an action (e.g., perform an actuation operation, and/or the like) based at least in part on the communication (e.g., a command).

Following the action, the S/A 406 may transmit communication 410 back to the PLC 402 during a period of time $T_{D\text{-}UL}$ 422. For example, the S/A 406 may respond with location information, temperature information, and/or the like. As another example, the S/A 406 may report, to the PLC 402, a result that occurs due to action from a command received from the PLC 402. The report may comprise an acknowledgement (e.g., an application layer acknowledgment). In addition, the S/A 406 may report a current status of the S/A 406 following a command (e.g., an updated location, and/or the like). The communication 410 that is transmitted from the S/A 406 to the PLC 402 may be referred to as an uplink communication (e.g., that is performed on a sidelink).

There may be a processing time duration 416 ($T_{AP}$) (e.g., an actuation duration and/or a sensing duration) between receipt of the communication 408 from the PLC 402 and transmission of the communication 410 from the S/A 406. Following receipt of the communication 410 from the sensor/actuator 406, there may be a processing duration 414 ($T_{AP}$) during which the PLC 402 processes the received information (e.g., communication 410), and before the PLC 402 sends additional communications (e.g., commands) to the S/A 406.

This cycle, described above, may have a duration 412 of length $T_{cycle}$. Following the duration TAP, the cycle may repeat with the PLC 402 sending additional communications 408 to the S/A 406.

The PLC 402 may use a control channel, such as a physical downlink control channel (PDCCH), to grant resources to the S/A 406 for use in transmitting the periodic uplink communication 410. Factory automation may involve a high S/A density (e.g., approximately one S/A (or UE) per square meter). Therefore, a large number of S/As may communicate with the PLC 402. Sending a dynamic grant (e.g., one downlink control information (DCI) message per slot) to each of the S/As may place a burden on PDCCH overhead. Semi-persistent scheduling (SPS) may be used to reduce the overhead requirements of the PDCCH by enabling the S/As to be granted resources in a semi-persistent or periodic manner. SPS may also be used to schedule resources for receiving downlink communication. The SPS may be communicated to the S/A 406 using radio resource control (RRC) signaling and/or DCI. In some examples, SPS may be used for an initial transmission, and a PDCCH (e.g., dynamic scheduling) may be used to schedule a possible retransmission if the initial transmission is not accurately received.

As indicated above, FIG. 4B is provided as an example. Other examples may differ from what is described with respect to FIG. 4B.

Figure 5:
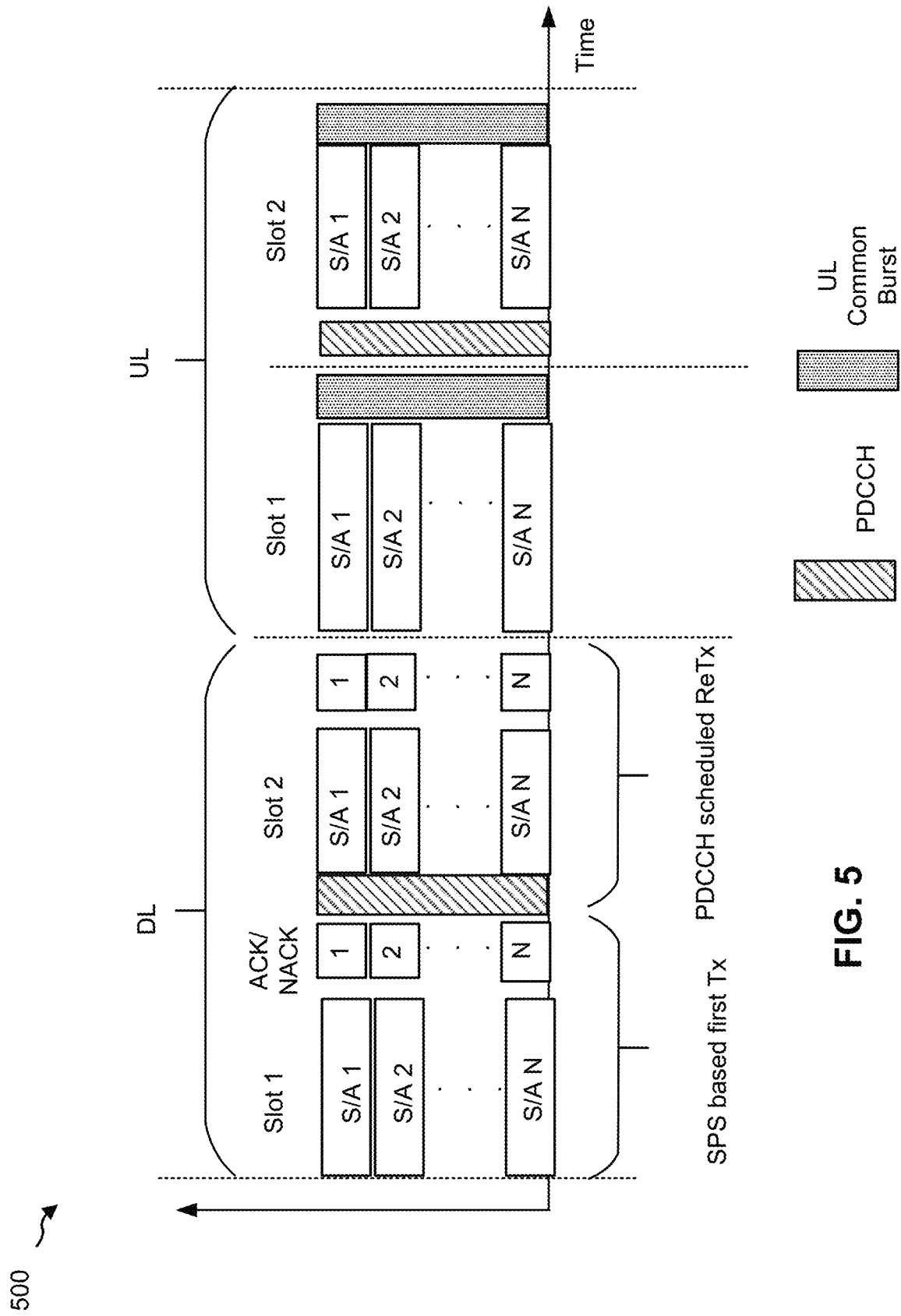
FIG. 5 is a diagram illustrating an example of wireless resource use, in accordance with the present disclosure.

FIG. 5 is a diagram illustrating an example 500 of wireless resource use, in accordance with the present disclosure.

FIG. 5 shows downlink (DL) transmissions from a PLC to S/A 1, S/A 2, and so forth, in a first slot (Slot 1) according to SPS. The PLC may receive acknowledgment (ACK) or negative ACK (NACK) feedback from the S/As. Based at least in part on the feedback, the PLC may transmit a PDCCH to schedule resources for a retransmission (e.g., in a second slot (Slot 2)) of the information to the S/As from which a NACK is received (or from which an ACK is not received).

In uplink (UL) communication, the PLC may receive uplink transmissions from S/A 1, S/A 2, and so forth, in a first slot (Slot 1) according to SPS. The PLC may provide ACK/NACK feedback to the S/As. The PLC may transmit a PDCCH to the S/As scheduling a retransmission (e.g., in a second slot (Slot 2)) for information that was not correctly received by the PLC.

As indicated above, FIG. 5 is provided as an example. Other examples may differ from what is described with respect to FIG. 5.

Figure 6:
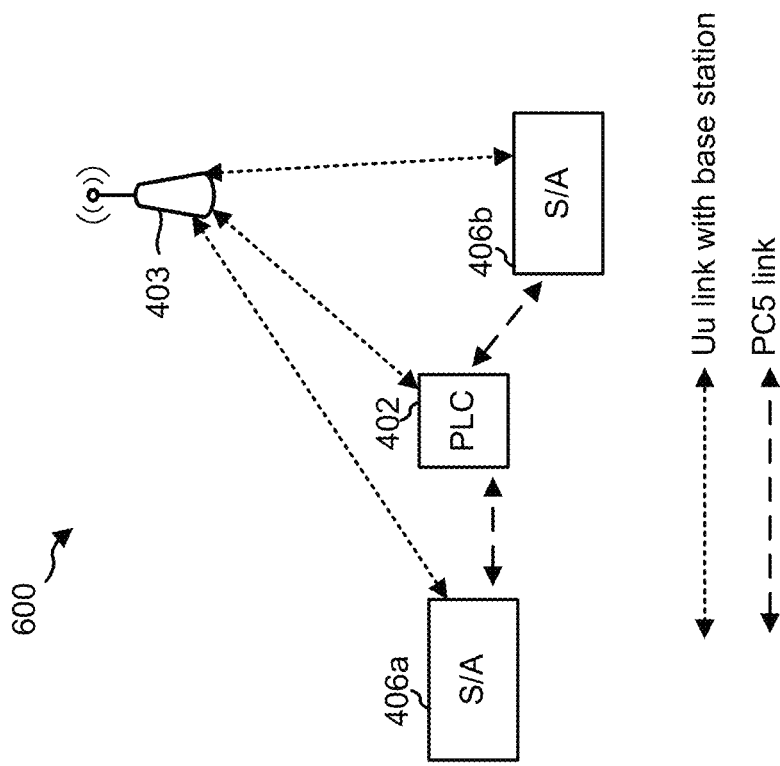
FIG. 6 is a diagram illustrating an example of a wireless communication system, in accordance with the present disclosure.

FIG. 6 is a diagram illustrating an example 600 of a wireless communication system, in accordance with the present disclosure. The wireless communication system may correspond to the wireless communication system described in connection with FIG. 4A. Accordingly, the wireless communication system may include a PLC 402, multiple S/As 406a and 406b, and a base station 403. In some aspects, the PLC 402 may be located closer to equipment, such as factory machinery, and the base station 403 may be located further from the equipment. For example, the base station 403 may be ceiling-mounted.

As in FIG. 6, a link (e.g., an access link) between the base station 403 and the PLC 402 may be according to a Uu interface. In addition, links (e.g., access links) between the base station 403 and the S/As 406a and 406b may also be according to a Uu interface. Links (e.g., sidelinks) between the PLC 402 and the S/As 406a and 406b may be according to a PC5 interface.

The PLC 402 may be, or may operate similar, to a UE or another sidelink device. In some examples, the PLC 402 may operate similar to a small cell or a relay node having a wireless backhaul to the base station 403. In some aspects, the PLC 402 may include aspects of an integrated access and backhaul (IAB) framework. For example, the PLC 402 may include a mobile termination (MT) component that operates similar to a UE in receiving control/data from the base station 403. Similarly, the PLC 402 may include a distributed unit (DU) component that schedules resources for communication with S/As 406a and/or 406b, and that provides downlink communication to S/As 406a and/or 406b.

The PLC 402 may use the base station 403 for inter-PLC coordination with other PLCs. The PLC 402 may use the base station 403 for a backhaul to a human machine interface (HMI). The PLC 402 may use the base station 403 as a system controller. The base station 403 may perform interference management (IM) across multiple PLCs 402. The base station 403 may handle other network functions for the S/As 406a and 406b, such as initial access with the network, mobility, and/or the like.

As the S/As 406a and 406b communicate with the PLC 402 on a sidelink, and with the base station 403 on an access link, the S/As 406a and 406b support both Uu and PC5 (e.g., sidelink) based communication. As the PLC 402 communicates with the S/As 406a and 406b on a sidelink, and with the base station 403 on an access link, the PLC 402 supports both Uu and PC5 (e.g., slidelink) based communication.

In some aspects, the PLC 402 and an S/A 406 may communicate using a first communication scheme that utilizes a single hop. The first communication scheme may be referred to as a single-hop scheme. In the single-hop scheme, transmissions and retransmissions between the PLC 402 and the S/A 406 occur on a sidelink. In some aspects, the base station 403 may schedule the transmissions and retransmissions on the sidelink.

In some aspects, the PLC 402 and an S/A 406 may communicate using a second communication scheme that utilizes two hops. The second communication scheme may be referred to as a two-hop scheme. In the two-hop scheme, transmissions and retransmissions between the PLC 402 and the S/A 406 are relayed by the base station 403 (e.g., on access links). For example, the PLC 402 may transmit (e.g., on a first access link) a message to the base station 403, and the base station 403 may transmit (e.g., on a second access link) the message to the S/A 403.

In some aspects, the PLC 402 and an S/A 406 may communicate using a third communication scheme that utilizes a hybrid of a single-hop scheme and a two-hop scheme. The third communication scheme may be referred to as a hybrid scheme. In the hybrid scheme, transmissions (e.g., initial transmissions) between the PLC 402 and the S/A 406 occur on a sidelink (as described above for the single-hop scheme) and retransmissions between the PLC 402 and the S/A 406 are relayed by the base station 403 (as described above for the two-hop scheme).

As indicated above, FIG. 6 is provided as an example. Other examples may differ from what is described with respect to FIG. 6.

Figure 7:
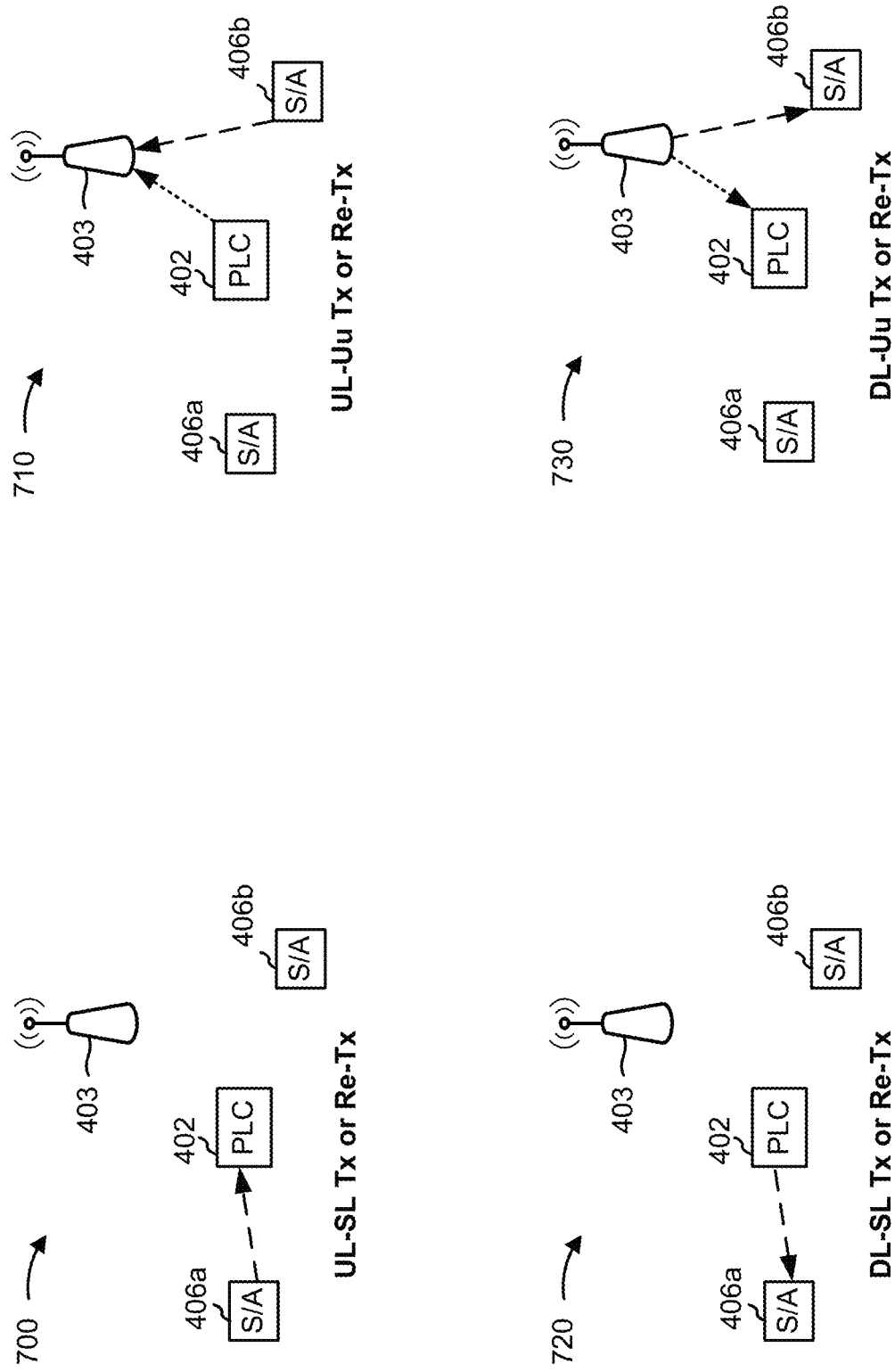
FIG. 7 illustrates examples of communication in a wireless communication system, in accordance with the present disclosure.

FIG. 7 illustrates examples of communication in a wireless communication system, in accordance with the present disclosure. The wireless communication system may correspond to the wireless communication system described in connection with FIG. 4A and/or FIG. 6.

Communication example 700 shows an uplink (shown as UL) transmission (Tx) or retransmission (Re-Tx) from an S/A 406a to a PLC 402 on a sidelink (SL). In some aspects, the S/A 406a may transmit an uplink transmission (e.g., an initial transmission) on a sidelink according to an SPS configuration, and/or transmit an uplink retransmission on the sidelink according to scheduling (e.g., dynamic scheduling) provided by the base station 403. An uplink transmission on a sidelink may be used as an initial transmission in a single-hop scheme or a hybrid scheme. An uplink retransmission on a sidelink may be used in a single-hop scheme. In some aspects, an uplink transmission on a sidelink may have a higher block error rate (BLER) relative to an uplink retransmission on a sidelink. For example, target BLERs for the transmission and retransmission may be set to $10^{-2}$ and $10^{-4}$, respectively.

Communication example 710 shows an uplink transmission or retransmission from the PLC 402 and/or an S/A 706b to the base station 403 on an access link (Uu). In some aspects, the PLC 402 may transmit an uplink transmission (e.g., an initial transmission) to the base station 403 on a first access link according to an SPS configuration, and/or the S/A 406b may transmit an uplink transmission (e.g., an initial transmission) to the base station 403 on a second access link according to an SPS configuration. In some aspects, the PLC 402 may transmit an uplink retransmission to the base station 403 on the first access link according to scheduling (e.g., dynamic scheduling) provided by the base station 403, and/or the S/A 406b may transmit an uplink retransmission to the base station 403 on the second access link according to scheduling (e.g., dynamic scheduling) provided by the base station 403. An uplink transmission on an access link may be used as an initial transmission in a two-hop scheme. An uplink retransmission on an access link may be used in a two-hop scheme or a hybrid scheme. In some aspects, an uplink transmission on an access link may have a higher BLER relative to an uplink retransmission on an access link. For example, target BLERs for the transmission and retransmission may be set to $10^{-2}$ and $10^{-4}$, respectively.

Communication example 720 shows a downlink (shown as DL) transmission or retransmission from the PLC 402 to the S/A 406a on a sidelink. In some aspects, the PLC 402 may transmit a downlink transmission (e.g., an initial transmission) to the S/A 406a on a sidelink according to an SPS configuration, and/or transmit a downlink retransmission on the sidelink according to scheduling (e.g., dynamic scheduling) provided by the base station 403. A downlink transmission on a sidelink may be used as an initial transmission in a single-hop scheme or a hybrid scheme. A downlink retransmission on a sidelink may be used in a single-hop scheme. In some aspects, a downlink transmission on a sidelink may have a higher BLER relative to a downlink retransmission on a sidelink. For example, target BLERs for the transmission and retransmission may be set to $10^{-2}$ and $10^{-4}$, respectively.

Communication example 730 shows a downlink transmission or retransmission from the base station 403 to the PLC 402 and/or the S/A 406b on an access link. In some aspects, the base station 403 may transmit a downlink transmission (e.g., an initial transmission) to the PLC 402 on a first access link according to an SPS configuration, and/or the base station 403 may transmit a downlink transmission (e.g., an initial transmission) to the S/A 406b on a second access link according to an SPS configuration. In some aspects, the base station 403 may transmit a downlink retransmission to the PLC 402 on the first access link according to scheduling (e.g., dynamic scheduling) provided by the base station 403, and/or the base station 403 may transmit a downlink retransmission to the S/A 406b on the second access link according to scheduling (e.g., dynamic scheduling) provided by the base station 403. A downlink transmission on an access link may be used as an initial transmission in a two-hop scheme. A downlink retransmission on an access link may be used in a two-hop scheme or a hybrid scheme. In some aspects, a downlink transmission on an access link may have a higher BLER relative to a downlink retransmission on an access link. For example, target BLERs for the transmission and retransmission may be set to $10^{-2}$ and $10^{-4}$, respectively.

In the wireless communication system, network capacity may be improved when a PLC and an S/A communicate using a single-hop scheme or a hybrid scheme. However, in some cases, a PLC and an S/A may need to communicate using a two-hop scheme due to blockages between the PLC and the S/A that prevent wireless communication. Use of these multiple schemes, and associated switching between transmission and reception modes, may result in processing delays, switching delays, and/or communication gaps (e.g., due to control messages).

Some techniques and apparatuses described herein enable communications, between one or more wireless devices (e.g., one or more PLCs, S/As, and/or the like) and/or a base station, in which an uplink transmission on a sidelink and a downlink transmission on a sidelink precedes an uplink transmission on an access link and a downlink transmission on an access link. In this way, the one or more wireless devices and/or the base station may communicate using a first communication scheme that uses sidelink transmission and retransmission (e.g., the single-hop scheme), a second communication scheme that uses access link transmission and retransmission (e.g., the two-hop scheme), and/or a third communication scheme that uses sidelink transmission and access link retransmission (e.g., the hybrid scheme). Moreover, the one or more wireless devices and/or the base station may communicate with reduced control message overhead, processing delays, and/or switching delays, to thereby improve network efficiency.

As indicated above, FIG. 7 is provided as an example. Other examples may differ from what is described with respect to FIG. 7.

Figure 8:
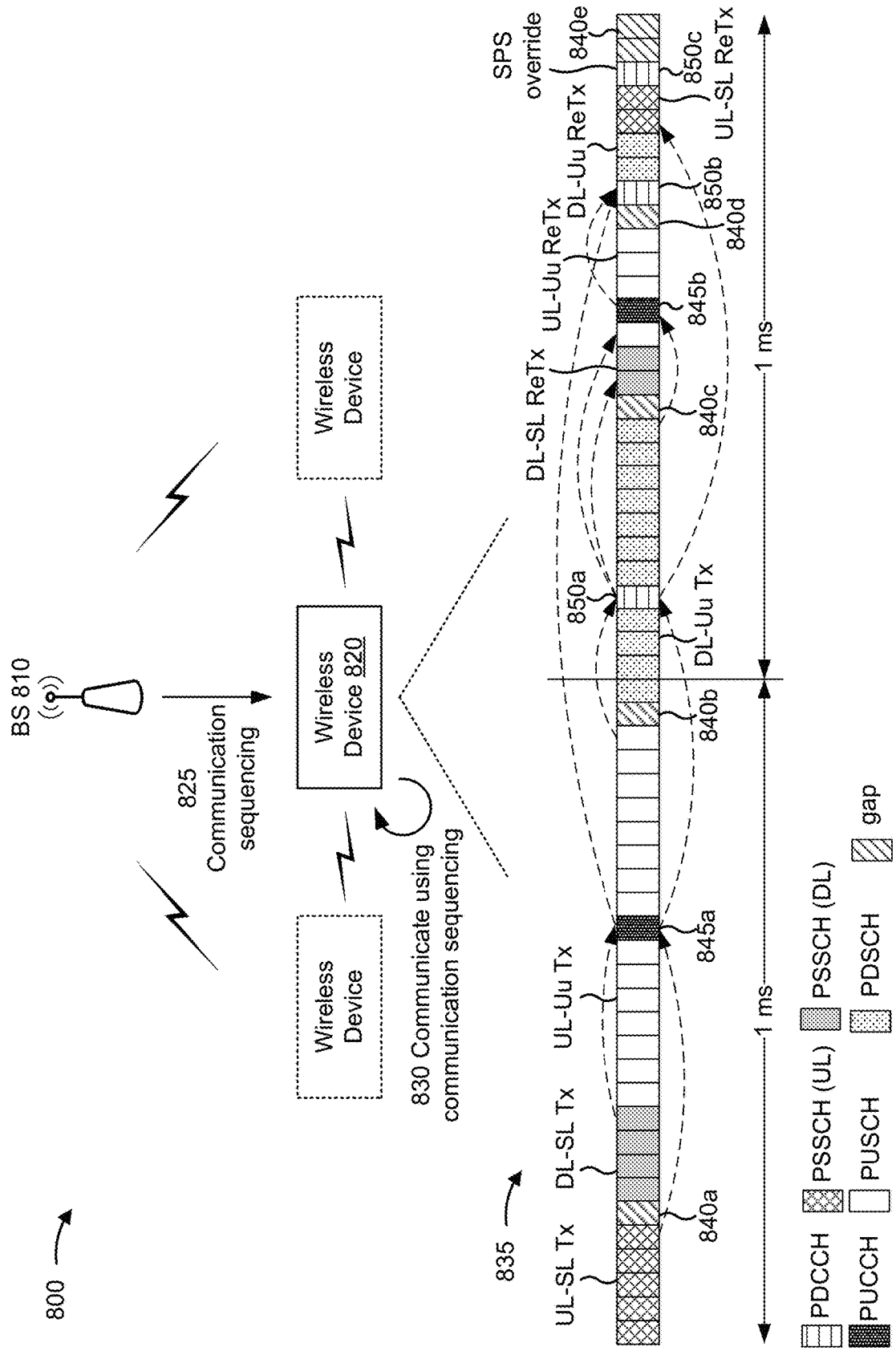
FIG. 8 is a diagram illustrating an example of communication sequencing, in accordance with the present disclosure.

FIG. 8 is a diagram illustrating an example 800 of communication sequencing, in accordance with the present disclosure. As shown in FIG. 8, a BS 810 and a wireless device 820 may communicate with one another. In some aspects, the BS 810 may be a base station in a wireless I-IoT network. In some aspects, the BS 810 may correspond to a BS 110, a base station 403, and/or the like. In some aspects, the wireless device 820 may be a PLC or an S/A in a wireless I-IoT network. In some aspects, wireless device 820 may correspond to a UE 120, a PLC 402, an S/A 406, and/or the like. For example, the wireless device 820 may be a PLC, and one or more other wireless devices (e.g., one or more S/As) may be in communication with the base station 110 and/or the wireless device 820.

As shown by reference number 825, the BS 810 may transmit, and the wireless device 820 may receive, information identifying a communication sequencing for communications between the BS 810, the wireless device 820, and/or one or more other wireless devices. The communication sequencing may be a sequence in which communications are to be transmitted. The communication sequencing may be for a first communication scheme that uses sidelink transmission and retransmission (e.g., a single-hop scheme), a second communication scheme that uses access link transmission and retransmission (e.g., a two-hop scheme), and a third communication scheme that uses sidelink transmission and access link retransmission (e.g., a hybrid scheme).

In some aspects, the BS 810 may transmit the information identifying the communication sequencing via higher-layer signaling (e.g., RRC signaling). In this way, the wireless device 820 may determine a sequence of communications that are to occur in the event that an initial transmission fails. In some aspects, the wireless device 820 may determine the communication sequencing (e.g., a sequence in which communications are to occur), or a portion thereof, based at least in part on another configuration, on scheduling, and/or the like. In some aspects, the BS 110 may transmit the information identifying the communication sequencing (or another configuration, scheduling, and/or the like) to one or more other wireless devices (e.g., one or more other PLCs, one or more other S/As, and/or the like).

As shown by reference number 830, the wireless device 820 may communicate based at least in part on the communication sequencing. For example, the wireless device 820 may communicate with the BS 810 and/or one or more other wireless devices. In some aspects, the wireless device 820 may communicate with the BS 810 and/or one or more other wireless devices using one or more of the first communication scheme (e.g., the single-hop scheme), the second communication scheme (e.g., the two-hop scheme), or the third communication scheme (e.g., the hybrid scheme). Similarly, the base station 810 may communicate with the wireless device 820 and/or one or more other wireless devices (e.g., one or more S/As) based at least in part on the communication sequencing, and using one or more of the first, second, or third communication scheme. In some aspects, the wireless device 820 and/or the base station 110 may communicate based at least in part on one or more determinations relating to a sequence in which communications are to occur (e.g., the communication sequencing or a portion thereof), as described below.

In some aspects, a frame structure 835 (e.g., used for communication in the I-IoT network) may be in accordance with the communication sequencing. For example, as shown, the frame structure 835 includes two slots (e.g., each slot having a 1 ms duration), and the two slots are 56 symbols (e.g., the frame structure uses a 30 kHz numerology). In some aspects, the communication sequencing may be used with a different frame structure, time frame, numerology, and/or the like.

The communication sequencing may provide a sequence for sidelink initial transmissions and/or retransmissions (e.g., in a physical sidelink shared channel (PSSCH)), and access link initial transmissions and/or retransmissions (e.g., in a physical uplink shared channel (PUSCH) or a physical downlink shared channel (PDSCH)), that minimizes gaps, processing delays, switching delays, and/or the like. In some aspects, an initial transmission may be according to an SPS configuration. For example, the base station 810 may transmit an SPS configuration to the wireless device 820 and/or one or more other wireless devices. As another example, the wireless device 820 (e.g., a PLC) may transmit an SPS configuration to one or more other wireless devices (e.g., S/As). In some aspects, a retransmission may be according to scheduling (e.g., DCI) transmitted by the base station 810 in a PDCCH.

In some aspects, the wireless device 820 and/or the base station 810 may determine (e.g., according to the communication sequencing) that an initial uplink transmission on a sidelink (e.g., communication example 700) and an initial downlink transmission on a sidelink (e.g., communication example 720) precedes an initial uplink transmission on an access link (e.g., communication example 710) and an initial downlink transmission on an access link (e.g., communication example 730). In some aspects, the wireless device 820 and/or the base station 810 may determine (e.g., according to the communication sequencing) that an initial uplink transmission on a sidelink precedes an initial downlink transmission on a sidelink. In this way, the initial downlink transmission on the sidelink is consecutive with (e.g., adjacent to) the initial uplink transmission on the access link, and the wireless device 820 may remain in a transmission mode to thereby avoid a switching delay. In some aspects, an initial downlink transmission on a sidelink may precede an initial uplink transmission on a sidelink with a gap interval following the initial uplink transmission on the sidelink.

In some aspects, the wireless device 820 and/or the base station 810 may determine (e.g., according to the communication sequencing) that an uplink retransmission on an access link (e.g., communication example 710) precedes a downlink retransmission on an access link (e.g., communication example 730). In some aspects, a sequence of sidelink retransmissions and access link retransmissions may be arbitrary provided that an uplink retransmission on an access link precedes a downlink retransmission on an access link.

In some aspects, the wireless device 820 and/or the base station 810 may determine (e.g., according to the communication sequencing) that a downlink retransmission on a sidelink (e.g., communication example 720) is consecutive with (e.g., adjacent to) an uplink retransmission on an access link (e.g., communication example 710). In this way, the wireless device 820 may remain in a transmission mode to thereby avoid a switching delay. In some aspects, the wireless device 820 and/or the base station 810 may determine (e.g., according to the communication sequencing) that an uplink retransmission on a sidelink (e.g., communication example 700) is consecutive with (e.g., adjacent to) a downlink retransmission on an access link (e.g., communication example 730). In this way, the wireless device 820 may remain in a reception mode to thereby avoid a switching delay.

In some aspects, the wireless device 820 and/or the base station 810 may determine (e.g., according to the communication sequencing) that a sequence of communications is an initial uplink transmission on a sidelink (e.g., communication example 700), an initial downlink transmission on a sidelink (e.g., communication example 720), an initial uplink transmission on an access link (e.g., communication example 710), an initial downlink transmission on an access link (e.g., communication example 730), a downlink retransmission on a sidelink (e.g., communication example 720), an uplink retransmission on an access link (e.g., communication example 710), a downlink retransmission on an access link (e.g., communication example 730), and an uplink retransmission on a sidelink (e.g., communication example 700). However, other communication sequencings may be used (e.g., in accordance with one or more of the criteria for the communication sequencing described above).

As shown in FIG. 8, the communication sequencing (e.g., as embodied in frame structure 835) may provide a sequencing for one or more gap intervals (shown as 840*a*, 840*b*, 840*c*, 840*d*, and 840*e*), one or more feedback intervals (shown as 845*a* and 845*b*), and/or one or more scheduling intervals (shown as 850*a*, 850*b*, and 850*c*). A gap interval, a feedback interval, or a scheduling interval may include one or more symbols.

In some aspects, the wireless device 820 may switch communication modes (e.g., from a transmission mode to a reception mode or from a reception mode to a transmission mode) in a gap interval. In some aspects, the wireless device 820 may report feedback (e.g., hybrid automatic repeat request (HARQ) ACK feedback, such as ACK/NACK feedback) in a feedback interval (e.g., a PLC may report feedback for an initial uplink transmission on a sidelink, an S/A may report feedback for an initial downlink transmission on a sidelink, and/or a PLC and/or an S/A may report feedback for an initial downlink transmission on an access link). That is, the wireless device 820 may transmit a physical uplink control channel (PUCCH) communication in a feedback interval. In some aspects, the wireless device 820 may receive scheduling from the base station 810 in a scheduling interval (e.g., an S/A may receive scheduling for an uplink retransmission on a sidelink, a PLC may receive scheduling for a downlink retransmission on a sidelink, a PLC and/or an S/A may receive scheduling for an uplink retransmission on an access link, and/or a PLC and/or an S/A may receive scheduling for a downlink retransmission on an access link). That is, the wireless device 820 may receive a PDCCH communication (e.g., DCI) in a scheduling interval.

In some aspects, the wireless device 820 and/or the base station 810 may determine (e.g., according to the communication sequencing) that a feedback interval 845*a* (e.g., one PUCCH symbol) is within an initial uplink transmission on an access link (e.g., so that the wireless device 820 may remain in a transmission mode). The wireless device 820 may use the feedback interval 845*a* for reporting feedback (e.g., HARQ ACK feedback) to the base station 810 for an initial uplink transmission on a sidelink or an initial downlink transmission on a sidelink. In some aspects, the feedback interval 845*a* is a threshold quantity of symbols (e.g., three, four, or five symbols) after the initial uplink transmission on the sidelink and/or the initial downlink transmission on the sidelink. The threshold quantity of symbols may correspond to an interval needed for processing of (e.g., by a PLC and/or an S/A) the initial uplink transmission on the sidelink and/or the initial downlink transmission on the sidelink.

In some aspects, the base station 810 may schedule an uplink retransmission on a sidelink (e.g., communication example 700) and/or a downlink retransmission on a sidelink (e.g., communication example 720) when NACK feedback is reported, or ACK feedback is not received by the base station 810. The base station 810 may schedule the retransmission(s) in a scheduling interval 850*a* (e.g., in a PDCCH). In some aspects, the wireless device 820 and/or the base station 810 may determine (e.g., according to the communication sequencing) that the scheduling interval 850*a* is within an initial downlink transmission on an access link (e.g., so that the wireless device 820 may remain in a reception mode). In some aspects, the base station 810 may schedule an uplink retransmission on an access link (e.g., communication example 710) in the scheduling interval 850*a* (e.g., if the base station 810 did not properly receive an initial uplink transmission on the access link). In some aspects, the scheduling interval 850*a* is a threshold quantity of symbols (e.g., three, four, or five symbols) before the uplink retransmission on the sidelink, the downlink retransmission on the sidelink, and/or the uplink retransmission on the access link (e.g., a quantity of symbols corresponding to an interval needed for processing of the PDCCH by a PLC and/or an S/A).

In some aspects, the wireless device 820 and/or the base station 810 may determine (e.g., according to the communication sequencing) that a feedback interval 845*b* (e.g., one PUCCH symbol) is within an uplink retransmission on an access link. The wireless device 820 may use the feedback interval 845*b* for reporting feedback (e.g., HARQ ACK feedback) to the base station 810 for an initial downlink transmission on an access link. In some aspects, the feedback interval 845*b* is a threshold quantity of symbols after the initial downlink transmission on the access link, as described above.

In some aspects, the base station 810 may schedule a downlink retransmission on an access link (e.g., communication example 730) when NACK feedback is reported, or ACK feedback is not received by the base station 810. The base station 810 may schedule the retransmission in a scheduling interval 850*b* (e.g., in a PDCCH). In some aspects, the wireless device 820 and/or the base station 810 may determine (e.g., according to the communication sequencing) that the scheduling interval 850*b* precedes the downlink retransmission on the access link (e.g., so that the wireless device 820 may remain in a reception mode). In some aspects, the base station 810 may schedule an uplink retransmission on a sidelink (e.g., communication example 700) in the scheduling interval 850*b* (e.g., if the uplink retransmission on the sidelink follows the scheduling interval 850*b* according to the communication sequencing).

In the first communication scheme (e.g., the single-hop scheme), the base station 810 may schedule an uplink retransmission on a sidelink and/or a downlink retransmission on a sidelink when an initial uplink transmission on a sidelink and/or an initial downlink transmission on a sidelink fails. In the second communication scheme (e.g., the two-hop scheme), the base station 810 may schedule an uplink retransmission on an access link and/or a downlink retransmission on an access link when an initial uplink transmission on an access link and/or an initial downlink transmission on an access link fails. In the third communication scheme (e.g., the hybrid scheme), the base station 810 may schedule an uplink retransmission on an access link and/or a downlink retransmission on an access link when an initial uplink transmission on a sidelink and/or an initial downlink transmission on a sidelink fails.

In some aspects, the base station 810 may transmit a PDCCH in a scheduling interval 850*c* that provides an SPS reconfiguration. For example, the base station 810 may modify or override an SPS configuration. The SPS configuration may be associated with an initial uplink transmission on a sidelink, an initial downlink transmission on a sidelink, an initial uplink transmission on an access link, and/or an initial downlink transmission on an access link.

In this way, devices in an I-IoT network may communicate using a single-hop scheme and/or a hybrid scheme, thereby improving network capacity, while minimizing control message overhead, processing delays, switching delays, and/or the like.

As indicated above, FIG. 8 is provided as an example. Other examples may differ from what is described with respect to FIG. 8.

Figure 9:
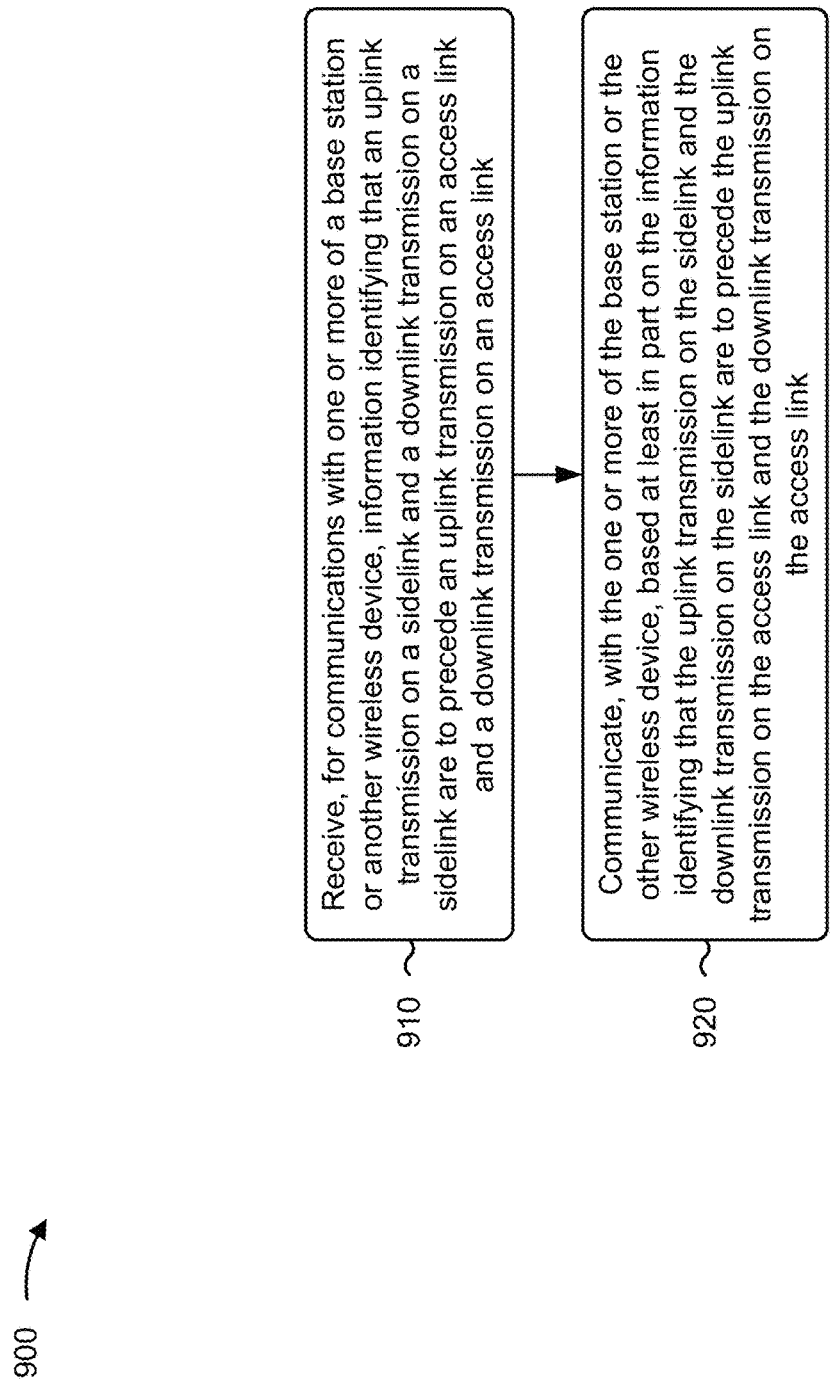
FIG. 9 is a diagram illustrating an example process performed, for example, by a wireless device, in accordance with the present disclosure.

FIG. 9 is a diagram illustrating an example process 900 performed, for example, by a wireless device, in accordance with the present disclosure. Example process 900 is an example where the wireless device (e.g., UE 120, PLC 402, S/A 406, wireless device 820, and/or the like) performs operations associated with communication sequencing.

As shown in FIG. 9, in some aspects, process 900 may include receiving, for communications with one or more of a base station or another wireless device, information identifying that an uplink transmission on a sidelink and a downlink transmission on a sidelink are to precede an uplink transmission on an access link and a downlink transmission on an access link (block 910). For example, the wireless device (e.g., using antenna 252, DEMOD 254, MIMO detector 256, receive processor 258, controller/processor 280, and/or the like) may receive, for communications with one or more of a base station or another wireless device, information identifying that an uplink transmission on a sidelink and a downlink transmission on a sidelink are to precede an uplink transmission on an access link and a downlink transmission on an access link, as described above.

As further shown in FIG. 9, in some aspects, process 900 may include communicating, with the one or more of the base station or the other wireless device, based at least in part on the information identifying that the uplink transmission on the sidelink and the downlink transmission on the sidelink are to precede the uplink transmission on the access link and the downlink transmission on the access link (block 920). For example, the wireless device (e.g., using antenna 252, DEMOD 254, MIMO detector 256, receive processor 258, controller/processor 280, transmit processor 264, TX MIMO processor 266, MOD 254, and/or the like) may communicate, with the one or more of the base station or the other wireless device, based at least in part on determining that the uplink transmission on the sidelink and the downlink transmission on the sidelink are to precede the uplink transmission on the access link and the downlink transmission on the access link, as described above.

Process 900 may include additional aspects, such as any single aspect or any combination of aspects described below and/or in connection with one or more other processes described elsewhere herein.

In a first aspect, communicating, with the one or more of the base station or the other wireless device, is further based at least in part on the information identifying that the uplink transmission on the sidelink is to precede the downlink transmission on the sidelink, and that the uplink transmission on the access link is to precede the downlink transmission on the access link.

In a second aspect, alone or in combination with the first aspect, communicating, with the one or more of the base station or the other wireless device, is further based at least in part on the information identifying that an uplink retransmission on an access link is to precede a downlink retransmission on an access link.

In a third aspect, alone or in combination with one or more of the first and second aspects, communicating, with the one or more of the base station or the other wireless device, is further based at least in part on the information identifying that a downlink retransmission on a sidelink is to be consecutive with an uplink retransmission on an access link.

In a fourth aspect, alone or in combination with one or more of the first through third aspects, communicating, with the one or more of the base station or the other wireless device, is further based at least in part on the information identifying that an uplink retransmission on a sidelink is to be consecutive with a downlink retransmission on an access link.

In a fifth aspect, alone or in combination with one or more of the first through fourth aspects, communicating, with the one or more of the base station or the other wireless device, is further based at least in part on the information identifying that a sequence of communications with the one or more of the base station or the other wireless device is to be the uplink transmission on the sidelink, the downlink transmission on the sidelink, the uplink transmission on the access link, the downlink transmission on the access link, a downlink retransmission on a sidelink, an uplink retransmission on an access link, a downlink retransmission on an access link, and an uplink retransmission on a sidelink.

In a sixth aspect, alone or in combination with one or more of the first through fifth aspects, one or more of the uplink transmission on the sidelink, the downlink transmission on the sidelink, the uplink transmission on the access link, or the downlink transmission on the access link is scheduled by SPS.

In a seventh aspect, alone or in combination with one or more of the first through sixth aspects, one or more of a downlink retransmission on a sidelink, an uplink retransmission on an access link, a downlink retransmission on an access link, or an uplink retransmission on a sidelink is scheduled by a PDCCH communication.

In an eighth aspect, alone or in combination with one or more of the first through seventh aspects, communicating, with the one or more of the base station or the other wireless device, is further based at least in part on the information identifying that one or more PUCCH symbols, within the uplink transmission on the access link, are for reporting feedback for at least one of the uplink transmission on the sidelink or the downlink transmission on the sidelink.

In a ninth aspect, alone or in combination with one or more of the first through eighth aspects, the one or more PUCCH symbols are a threshold quantity of symbols after at least one of the uplink transmission on the sidelink or the downlink transmission on the sidelink.

In a tenth aspect, alone or in combination with one or more of the first through ninth aspects, communicating, with the one or more of the base station or the other wireless device, is further based at least in part on the information identifying that one or more PDCCH symbols, within the downlink transmission on the access link, are for control information that schedules at least one of an uplink retransmission on a sidelink, a downlink retransmission on a sidelink, or an uplink retransmission on an access link.

In an eleventh aspect, alone or in combination with one or more of the first through tenth aspects, the one or more PDCCH symbols are a threshold quantity of symbols before at least one of the uplink retransmission on the sidelink, the downlink retransmission on the sidelink, or the uplink retransmission on the access link.

In a twelfth aspect, alone or in combination with one or more of the first through eleventh aspects, process 900 includes receiving the information, via higher-layer signaling, that indicates that the uplink transmission on the sidelink and the downlink transmission on the sidelink are to precede the uplink transmission on the access link and the downlink transmission on the access link.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
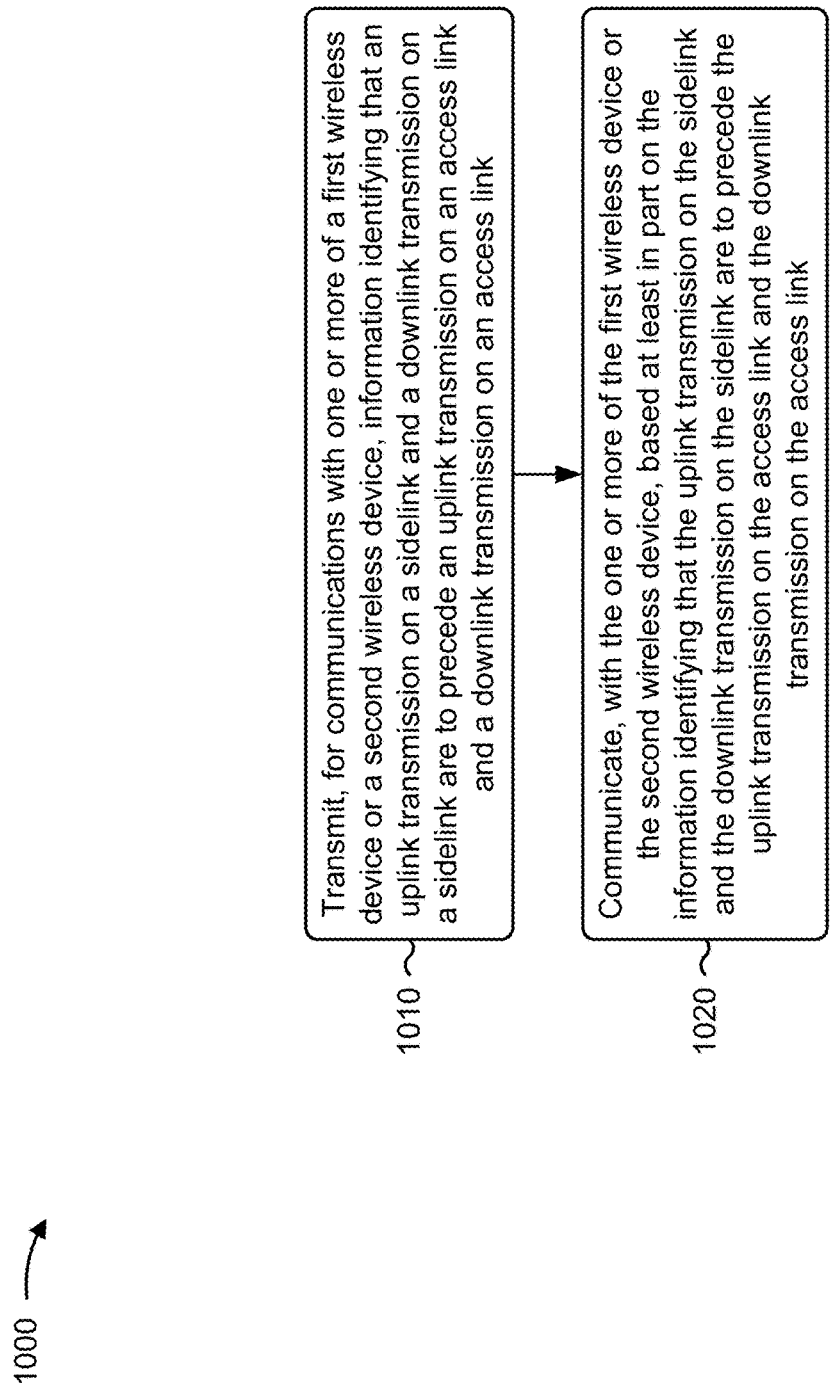
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110, base station 403, base station 810, and/or the like) performs operations associated with communication sequencing.

As shown in FIG. 10, in some aspects, process 1000 may include transmitting, for communications with one or more of a first wireless device or a second wireless device, information identifying that an uplink transmission on a sidelink and a downlink transmission on a sidelink are to precede an uplink transmission on an access link and a downlink transmission on an access link (block 1010). For example, the base station (e.g., using transmit processor 220, TX MIMO processor 230, modulator 232, antenna 234, controller/processor 240, and/or the like) may transmit, for communications with one or more of a first wireless device or a second wireless device, information identifying that an uplink transmission on a sidelink and a downlink transmission on a sidelink are to precede an uplink transmission on an access link and a downlink transmission on an access link, as described above.

As further shown in FIG. 10, in some aspects, process 1000 may include communicating, with the one or more of the first wireless device or the second wireless device, based at least in part on the information identifying that the uplink transmission on the sidelink and the downlink transmission on the sidelink are to precede the uplink transmission on the access link and the downlink transmission on the access link (block 1020). For example, the base station (e.g., using controller/processor 240, transmit processor 220, TX MIMO processor 230, MOD 232, antenna 234, DEMOD 232, MIMO detector 236, receive processor 238, and/or the like) may communicate, with the one or more of the first wireless device or the second wireless device, based at least in part on the information identifying that the uplink transmission on the sidelink and the downlink transmission on the sidelink are to precede the uplink transmission on the access link and the downlink transmission on the access link, as described above.

Process 1000 may include additional aspects, such as any single aspect or any combination of aspects described below and/or in connection with one or more other processes described elsewhere herein.

In a first aspect, communicating, with the one or more of the first wireless device or the second wireless device, is further based at least in part on the information identifying that the uplink transmission on the sidelink is to precede the downlink transmission on the sidelink, and that the uplink transmission on the access link is to precede the downlink transmission on the access link.

In a second aspect, alone or in combination with the first aspect, communicating, with the one or more of the first wireless device or the second wireless device, is further based at least in part on the information identifying that an uplink retransmission on an access link is to precede a downlink retransmission on an access link.

In a third aspect, alone or in combination with one or more of the first and second aspects, communicating, with the one or more of the first wireless device or the second wireless device, is further based at least in part on the information identifying that a downlink retransmission on a sidelink is to be consecutive with an uplink retransmission on an access link.

In a fourth aspect, alone or in combination with one or more of the first through third aspects, communicating, with the one or more of the first wireless device or the second wireless device, is further based at least in part on the information identifying that an uplink retransmission on a sidelink is to be consecutive with a downlink retransmission on an access link.

In a fifth aspect, alone or in combination with one or more of the first through fourth aspects, communicating, with the one or more of the first wireless device or the second wireless device, is further based at least in part on the information identifying that a sequence of communications with the one or more of the first wireless device or the second wireless device is to be the uplink transmission on the sidelink, the downlink transmission on the sidelink, the uplink transmission on the access link, the downlink transmission on the access link, a downlink retransmission on a sidelink, an uplink retransmission on an access link, a downlink retransmission on an access link, and an uplink retransmission on a sidelink.

In a sixth aspect, alone or in combination with one or more of the first through fifth aspects, one or more of the uplink transmission on the sidelink, the downlink transmission on the sidelink, the uplink transmission on the access link, or the downlink transmission on the access link is scheduled by SPS.

In a seventh aspect, alone or in combination with one or more of the first through sixth aspects, one or more of a downlink retransmission on a sidelink, an uplink retransmission on an access link, a downlink retransmission on an access link, or an uplink retransmission on a sidelink is scheduled by a PDCCH communication.

In an eighth aspect, alone or in combination with one or more of the first through seventh aspects, communicating, with the one or more of the first wireless device or the second wireless device, is further based at least in part on the information identifying that one or more PUCCH symbols, within the uplink transmission on the access link, are for reporting feedback for at least one of the uplink transmission on the sidelink or the downlink transmission on the sidelink.

In a ninth aspect, alone or in combination with one or more of the first through eighth aspects, the one or more PUCCH symbols are a threshold quantity of symbols after at least one of the uplink transmission on the sidelink or the downlink transmission on the sidelink.

In a tenth aspect, alone or in combination with one or more of the first through ninth aspects, communicating, with the one or more of the first wireless device or the second wireless device, is further based at least in part on the information identifying that one or more PDCCH symbols, within the downlink transmission on the access link, are for control information that schedules at least one of an uplink retransmission on a sidelink, a downlink retransmission on a sidelink, or an uplink retransmission on an access link.

In an eleventh aspect, alone or in combination with one or more of the first through tenth aspects, the one or more PDCCH symbols are a threshold quantity of symbols before at least one of the uplink retransmission on the sidelink, the downlink retransmission on the sidelink, or the uplink retransmission on the access link.

In a twelfth aspect, alone or in combination with one or more of the first through eleventh aspects, process 1000 includes transmitting the information, via higher-layer signaling, that indicates that the uplink transmission on the sidelink and the downlink transmission on the sidelink are to precede the uplink transmission on the access link and the downlink transmission on the access link.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a wireless device, comprising: receiving, for communications with one or more of a base station or another wireless device, information identifying that an uplink transmission on a sidelink and a downlink transmission on a sidelink are to precede an uplink transmission on an access link and a downlink transmission on an access link; and communicating, with the one or more of the base station or the other wireless device, based at least in part on the information identifying that the uplink transmission on the sidelink and the downlink transmission on the sidelink are to precede the uplink transmission on the access link and the downlink transmission on the access link.

Aspect 2: The method of Aspect 1, wherein communicating, with the one or more of the base station or the other wireless device, is further based at least in part on the information identifying that the uplink transmission on the sidelink is to precede the downlink transmission on the sidelink, and that the uplink transmission on the access link is to precede the downlink transmission on the access link.

Aspect 3: The method of any of Aspects 1-2, wherein communicating, with the one or more of the base station or the other wireless device, is further based at least in part on the information identifying that an uplink retransmission on an access link is to precede a downlink retransmission on an access link.

Aspect 4: The method of any of Aspects 1-3, wherein communicating, with the one or more of the base station or the other wireless device, is further based at least in part on the information identifying that a downlink retransmission on a sidelink is to be consecutive with an uplink retransmission on an access link.

Aspect 5: The method of any of Aspects 1-4, wherein communicating, with the one or more of the base station or the other wireless device, is further based at least in part on the information identifying that an uplink retransmission on a sidelink is to be consecutive with a downlink retransmission on an access link.

Aspect 6: The method of any of Aspects 1-5, wherein communicating, with the one or more of the base station or the other wireless device, is further based at least in part on the information identifying that a sequence of communications with the one or more of the base station or the other wireless device is to be the uplink transmission on the sidelink, the downlink transmission on the sidelink, the uplink transmission on the access link, the downlink transmission on the access link, a downlink retransmission on a sidelink, an uplink retransmission on an access link, a downlink retransmission on an access link, and an uplink retransmission on a sidelink.

Aspect 7: The method of any of Aspects 1-6, wherein one or more of the uplink transmission on the sidelink, the downlink transmission on the sidelink, the uplink transmission on the access link, or the downlink transmission on the access link is scheduled by semi-persistent scheduling.

Aspect 8: The method of any of Aspects 1-7, wherein one or more of a downlink retransmission on a sidelink, an uplink retransmission on an access link, a downlink retransmission on an access link, or an uplink retransmission on a sidelink is scheduled by a physical downlink control channel communication.

Aspect 9: The method of any of Aspects 1-8, wherein communicating, with the one or more of the base station or the other wireless device, is further based at least in part on the information identifying that one or more physical uplink control channel (PUCCH) symbols, within the uplink transmission on the access link, are for reporting feedback for at least one of the uplink transmission on the sidelink or the downlink transmission on the sidelink.

Aspect 10: The method of Aspect 9, wherein the one or more PUCCH symbols are a threshold quantity of symbols after at least one of the uplink transmission on the sidelink or the downlink transmission on the sidelink.

Aspect 11: The method of any of Aspects 1-10, wherein communicating, with the one or more of the base station or the other wireless device, is further based at least in part on the information identifying that one or more physical downlink control channel (PDCCH) symbols, within the downlink transmission on the access link, are for control information that schedules at least one of an uplink retransmission on a sidelink, a downlink retransmission on a sidelink, or an uplink retransmission on an access link.

Aspect 12: The method of Aspect 11, wherein the one or more PDCCH symbols are a threshold quantity of symbols before at least one of the uplink retransmission on the sidelink, the downlink retransmission on the sidelink, or the uplink retransmission on the access link.

Aspect 13: The method of any of Aspects 1-12, wherein receiving the information comprises receiving the information, via higher-layer signaling, that indicates that the uplink transmission on the sidelink and the downlink transmission on the sidelink are to precede the uplink transmission on the access link and the downlink transmission on the access link.

Aspect 14: A method of wireless communication performed by a base station, comprising: transmitting, for communications with one or more of a first wireless device or a second wireless device, information identifying that an uplink transmission on a sidelink and a downlink transmission on a sidelink are to precede an uplink transmission on an access link and a downlink transmission on an access link; and communicating, with the one or more of the first wireless device or the second wireless device, based at least in part on the information indicating that the uplink transmission on the sidelink and the downlink transmission on the sidelink are to precede the uplink transmission on the access link and the downlink transmission on the access link.

Aspect 15: The method of Aspect 14, wherein communicating, with the one or more of the first wireless device or the second wireless device, is further based at least in part on the information identifying that the uplink transmission on the sidelink is to precede the downlink transmission on the sidelink, and that the uplink transmission on the access link is to precede the downlink transmission on the access link.

Aspect 16: The method of any of Aspects 14-15, wherein communicating, with the one or more of the first wireless device or the second wireless device, is further based at least in part on the information identifying that an uplink retransmission on an access link is to precede a downlink retransmission on an access link.

Aspect 17: The method of any of Aspects 14-16, wherein communicating, with the one or more of the first wireless device or the second wireless device, is further based at least in part on the information identifying that a downlink retransmission on a sidelink is to be consecutive with an uplink retransmission on an access link.

Aspect 18: The method of any of Aspects 14-17, wherein communicating, with the one or more of the first wireless device or the second wireless device, is further based at least in part on the information identifying that an uplink retransmission on a sidelink is to be consecutive with a downlink retransmission on an access link.

Aspect 19: The method of any of Aspects 14-18, wherein communicating, with the one or more of the first wireless device or the second wireless device, is further based at least in part on the information identifying that a sequence of communications with the one or more of the first wireless device or the second wireless device is to be the uplink transmission on the sidelink, the downlink transmission on the sidelink, the uplink transmission on the access link, the downlink transmission on the access link, a downlink retransmission on a sidelink, an uplink retransmission on an access link, a downlink retransmission on an access link, and an uplink retransmission on a sidelink.

Aspect 20: The method of any of Aspects 14-19, wherein one or more of the uplink transmission on the sidelink, the downlink transmission on the sidelink, the uplink transmission on the access link, or the downlink transmission on the access link is scheduled by semi-persistent scheduling.

Aspect 21: The method of any of Aspects 14-20, wherein one or more of a downlink retransmission on a sidelink, an uplink retransmission on an access link, a downlink retransmission on an access link, or an uplink retransmission on a sidelink is scheduled by a physical downlink control channel communication.

Aspect 22: The method of any of Aspects 14-21, wherein communicating, with the one or more of the first wireless device or the second wireless device, is further based at least in part on the information identifying that one or more physical uplink control channel (PUCCH) symbols, within the uplink transmission on the access link, are for reporting feedback for at least one of the uplink transmission on the sidelink or the downlink transmission on the sidelink.

Aspect 23: The method of Aspect 22, wherein the one or more PUCCH symbols are a threshold quantity of symbols after at least one of the uplink transmission on the sidelink or the downlink transmission on the sidelink.

Aspect 24: The method of any of Aspects 14-23, wherein communicating, with the one or more of the first wireless device or the second wireless device, is further based at least in part on the information identifying that one or more physical downlink control channel (PDCCH) symbols, within the downlink transmission on the access link, are for control information that schedules at least one of an uplink retransmission on a sidelink, a downlink retransmission on a sidelink, or an uplink retransmission on an access link.

Aspect 25: The method of Aspect 24, wherein the one or more PDCCH symbols are a threshold quantity of symbols before at least one of the uplink retransmission on the sidelink, the downlink retransmission on the sidelink, or the uplink retransmission on the access link.

Aspect 26: The method of any of Aspects 14-25, wherein transmitting the information comprises transmitting the information, via higher-layer signaling, that indicates that the uplink transmission on the sidelink and the downlink transmission on the sidelink are to precede the uplink transmission on the access link and the downlink transmission on the access link.

Aspect 27: An apparatus for wireless communication at a device, comprising a processor; memory coupled with the processor; and instructions stored in the memory and executable by the processor to cause the apparatus to perform the method of one or more Aspects of Aspects 1-13.

Aspect 28: A device for wireless communication, comprising a memory and one or more processors coupled to the memory, the memory and the one or more processors configured to perform the method of one or more Aspects of Aspects 1-13.

Aspect 29: An apparatus for wireless communication, comprising at least one means for performing the method of one or more Aspects of Aspects 1-13.

Aspect 30: A non-transitory computer-readable medium storing code for wireless communication, the code comprising instructions executable by a processor to perform the method of one or more Aspects of Aspects 1-13.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 32: An apparatus for wireless communication at a device, comprising a processor; memory coupled with the processor; and instructions stored in the memory and executable by the processor to cause the apparatus to perform the method of one or more Aspects of Aspects 14-26.

Aspect 33: A device for wireless communication, comprising a memory and one or more processors coupled to the memory, the memory and the one or more processors configured to perform the method of one or more Aspects of Aspects 14-26.

Aspect 34: An apparatus for wireless communication, comprising at least one means for performing the method of one or more Aspects of Aspects 14-26.

Aspect 35: A non-transitory computer-readable medium storing code for wireless communication, the code comprising instructions executable by a processor to perform the method of one or more Aspects of Aspects 14-26.

Aspect 36: A non-transitory computer-readable medium storing a set of instructions for wireless communication, the set of instructions comprising one or more instructions that, when executed by one or more processors of a device, cause the device to perform the method of one or more Aspects of Aspects 14-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless device for wireless communication, comprising:
   a memory; and
   one or more processors, operatively coupled to the memory, configured to:
      receive, for communications with one or more of a base station or another wireless device, information identifying that an uplink transmission on a first sidelink and a downlink transmission on a second sidelink are to precede an uplink transmission on a first access link and a downlink transmission on a second access link; and
      communicate, with the one or more of the base station or the other wireless device, based at least in part on the information identifying that the uplink transmission on the first sidelink and the downlink transmission on the second sidelink are to precede the uplink transmission on the first access link and the downlink transmission on the second access link.

2. The wireless device of claim 1, wherein the one or more processors are configured to communicate, with the one or more of the base station or the other wireless device, further based at least in part on the information identifying that the uplink transmission on the first sidelink is to precede the downlink transmission on the second sidelink, and that the uplink transmission on the first access link is to precede the downlink transmission on the second access link.

3. The wireless device of claim 1, wherein the one or more processors are configured to communicate, with the one or more of the base station or the other wireless device, further based at least in part on the information identifying that an uplink retransmission on the first access link is to precede a downlink retransmission on the second access link.

4. The wireless device of claim 1, wherein the one or more processors are configured to communicate, with the one or more of the base station or the other wireless device, further based at least in part on the information identifying that a downlink retransmission on the second sidelink is to be consecutive with an uplink retransmission on the first access link.

5. The wireless device of claim 1, wherein the one or more processors are configured to communicate, with the one or more of the base station or the other wireless device, further based at least in part on the information identifying that an uplink retransmission on the first sidelink is to be consecutive with a downlink retransmission on the second access link.

6. The wireless device of claim 1, wherein the one or more processors are configured to communicate, with the one or more of the base station or the other wireless device, further based at least in part on the information identifying that a sequence of communications with the one or more of the base station or the other wireless device is to be the uplink transmission on the first sidelink, the downlink transmission on the second sidelink, the uplink transmission on the first access link, the downlink transmission on the second access link, a downlink retransmission on the second sidelink, an uplink retransmission on the first access link, a downlink retransmission on the second access link, and an uplink retransmission on the first sidelink.

7. The wireless device of claim 1, wherein one or more of the uplink transmission on the first sidelink, the downlink transmission on the second sidelink, the uplink transmission on the first access link, or the downlink transmission on the second access link is scheduled by semi-persistent scheduling.

8. The wireless device of claim 1, wherein one or more of a downlink retransmission on the second sidelink, an uplink retransmission on the first access link, a downlink retransmission on the second access link, or an uplink retransmission on the first sidelink is scheduled by a physical downlink control channel communication.

9. The wireless device of claim 1, wherein the one or more processors are configured to communicate, with the one or more of the base station or the other wireless device, further based at least in part on the information identifying that one or more physical uplink control channel symbols, within the uplink transmission on the first access link, are for reporting feedback for at least one of the uplink transmission on the first sidelink or the downlink transmission on the second sidelink.

10. The wireless device of claim 1, wherein the one or more processors are configured to communicate, with the one or more of the base station or the other wireless device, further based at least in part on the information identifying that one or more physical downlink control channel symbols, within the downlink transmission on the second access link, are for control information that schedules at least one of an uplink retransmission on the first sidelink, a downlink retransmission on the second sidelink, or an uplink retransmission on the first access link.

11. A base station for wireless communication, comprising:
    a memory; and
    one or more processors, operatively coupled to the memory, configured to:
       transmit, for communications with one or more of a first wireless device or a second wireless device, information identifying that an uplink transmission on a first sidelink and a downlink transmission on a second sidelink are to precede an uplink transmission on a first access link and a downlink transmission on a second access link; and
       communicate, with the one or more of the first wireless device or the second wireless device, based at least in part on the information indicating that the uplink transmission on the first sidelink and the downlink transmission on the second sidelink are to precede the uplink transmission on the first access link and the downlink transmission on the second access link.

12. The base station of claim 11, wherein the one or more processors are configured to communicate, with the one or more of the first wireless device or the second wireless device, further based at least in part on the information identifying that the uplink transmission on the first sidelink is to precede the downlink transmission on the second sidelink, and that the uplink transmission on the first access link is to precede the downlink transmission on the second access link.

13. The base station of claim 11, wherein the one or more processors are configured to communicate, with the one or more of the first wireless device or the second wireless device, further based at least in part on the information identifying that an uplink retransmission on the first access link is to precede a downlink retransmission on the first access link.

14. The base station of claim 11, wherein the one or more processors are configured to communicate, with the one or more of the first wireless device or the second wireless device, further based at least in part on the information identifying that a downlink retransmission on the second sidelink is to be consecutive with an uplink retransmission on the first access link.

15. The base station of claim 11, wherein the one or more processors are configured to communicate, with the one or more of the first wireless device or the second wireless device, further based at least in part on the information identifying that an uplink retransmission on the first sidelink is to be consecutive with a downlink retransmission on the second access link.

16. The base station of claim 11, wherein the one or more processors are configured to communicate, with the one or more of the first wireless device or the second wireless device, further based at least in part on the information identifying that a sequence of communications with the one or more of the first wireless device or the second wireless device is to be the uplink transmission on the first sidelink, the downlink transmission on the second sidelink, the uplink transmission on the first access link, the downlink transmission on the second access link, a downlink retransmission on the second sidelink, an uplink retransmission on the first access link, a downlink retransmission on the second access link, and an uplink retransmission on the first sidelink.

17. The base station of claim 11, wherein one or more of the uplink transmission on the first sidelink, the downlink transmission on the second sidelink, the uplink transmission on the first access link, or the downlink transmission on the second access link is scheduled by semi-persistent scheduling.

18. The base station of claim 11, wherein one or more of a downlink retransmission on the second sidelink, an uplink retransmission on the first access link, a downlink retransmission on the second access link, or an uplink retransmission on the first sidelink is scheduled by a physical downlink control channel communication.

19. The base station of claim 11, wherein the one or more processors are configured to communicate, with the one or more of the first wireless device or the second wireless device, further based at least in part on the information identifying that one or more physical uplink control channel symbols, within the uplink transmission on the first access link, are for reporting feedback for at least one of the uplink transmission on the first sidelink or the downlink transmission on the second sidelink.

20. The base station of claim 11, wherein the one or more processors are configured to communicate, with the one or more of the first wireless device or the second wireless device, further based at least in part on the information identifying that one or more physical downlink control channel symbols, within the downlink transmission on the second access link, are for control information that schedules at least one of an uplink retransmission on the first sidelink, a downlink retransmission on the second sidelink, or an uplink retransmission on the first access link.

21. A method of wireless communication performed by a wireless device, comprising:
receiving, for communications with one or more of a base station or another wireless device, information identifying that an uplink transmission on a first sidelink and a downlink transmission on a second sidelink are to precede an uplink transmission on a first access link and a downlink transmission on a second access link; and
communicating, with the one or more of the base station or the other wireless device, based at least in part on the information identifying that the uplink transmission on the first sidelink and the downlink transmission on the second sidelink are to precede the uplink transmission on the first access link and the downlink transmission on the second access link.

22. The method of claim 21, wherein communicating, with the one or more of the base station or the other wireless device, is further based at least in part on the information identifying that the uplink transmission on the first sidelink is to precede the downlink transmission on the second sidelink, and that the uplink transmission on the first access link is to precede the downlink transmission on the second access link.

23. The method of claim 21, wherein communicating, with the one or more of the base station or the other wireless device, is further based at least in part on the information identifying that an uplink retransmission on the first access link is to precede a downlink retransmission on the second access link.

24. The method of claim 21, wherein communicating, with the one or more of the base station or the other wireless device, is further based at least in part on the information identifying that a downlink retransmission on the second sidelink is to be consecutive with an uplink retransmission on the first access link.

25. The method of claim 21, wherein communicating, with the one or more of the base station or the other wireless device, is further based at least in part on the information identifying that an uplink retransmission on the first sidelink is to be consecutive with a downlink retransmission on the second access link.

26. A method of wireless communication performed by a base station, comprising:
transmitting, for communications with one or more of a first wireless device or a second wireless device, information identifying that an uplink transmission on a first sidelink and a downlink transmission on a second sidelink are to precede an uplink transmission on a first access link and a downlink transmission on a second access link; and
communicating, with the one or more of the first wireless device or the second wireless device, based at least in part on the information indicating that the uplink transmission on the first sidelink and the downlink transmission on the second sidelink are to precede the uplink transmission on the first access link and the downlink transmission on the second access link.

27. The method of claim 26, wherein communicating, with the one or more of the first wireless device or the second wireless device, is further based at least in part on the information identifying that the uplink transmission on the first sidelink is to precede the downlink transmission on the second sidelink, and that the uplink transmission on the first access link is to precede the downlink transmission on the second access link.

28. The method of claim 26, wherein communicating, with the one or more of the first wireless device or the second wireless device, is further based at least in part on the information identifying that an uplink retransmission on the first access link is to precede a downlink retransmission on the first access link.

29. The method of claim 26, wherein communicating, with the one or more of the first wireless device or the second wireless device, is further based at least in part on the information identifying that a downlink retransmission on the second sidelink is to be consecutive with an uplink retransmission on the first access link.

30. The method of claim 26, wherein communicating, with the one or more of the first wireless device or the second wireless device, is further based at least in part on the information identifying that an uplink retransmission on the first sidelink is to be consecutive with a downlink retransmission on the second access link.

* * * * *